United States Patent [19]

Silverman

[11] Patent Number: 4,675,904
[45] Date of Patent: Jun. 23, 1987

[54] METHOD FOR DETECTING SUICIDAL PREDISPOSITION

[75] Inventor: Stephen E. Silverman, Weston, Conn.

[73] Assignee: Compusonics, Inc., Weston, Conn.

[21] Appl. No.: 522,398

[22] Filed: Aug. 11, 1983

[51] Int. Cl.⁴ .................................................. G10L 5/00
[52] U.S. Cl. ...................................... 381/41; 128/773
[58] Field of Search ................................. 381/29–50;
364/513.5, 513; 128/773, 1 R

[56] References Cited

U.S. PATENT DOCUMENTS

3,855,418 12/1974 Fuller .................................... 381/41

Primary Examiner—E. S. Matt Kemeny

[57] ABSTRACT

A method for detecting suicidal predisposition in a person by securing an utterance from the person, identifying the person as being suicidally predisposed if the utterance decays substantially non-instantaneously upon conclusion and identifying the person as being suicidally predisposed if signal amplitude modulation during the utterance is low.

1 Claim, 9 Drawing Figures

METHOD FOR DETECTING SUICIDAL PREDISPOSITION

FIELD OF THE INVENTION

This invention relates to analysis of the human voice as an aid in detecting, diagnosing and treating psychiatric disorders and particularly in detecting suicidal predisposition.

DESCRIPTION OF THE PRIOR ART

The prior art references known to applicant and believed most relevant to the patentability of this invention are U.S. Pat. Nos. 3,278,685; 3,855,416; 3,855,417; 3,855,418; 3,971,034; 4,093,821; 4,139,732 and 4,142,067 and the following publications: "Teaching the Perception of Expressive Aspects of Vocal Communication", appearing at pages 107 through 115 of the August 1967 issue of the *American Journal of Psychiatry*, and "Infra-content Channels of Vocal Communication" appearing as Chapter 29 of *Disorders of Communication*, published in 1964 by the Association for Research in Nervous and Mental Disease. Two additional publications known to applicant, which applicant does not concede to be prior art with respect to this invention, are "Speech and Disturbances Affect" appearing as Chapter 17 in *Speech Evaluation In Psychiatry*, published in 1981 by Grune & Stratton, Inc. and page 8 of a recent publication entitled *Medical Bulletin*.

Of the patent literature, the U.S. Pat. Nos. 3,855,416, 3,855,418, and 3,971,034 are believed the most relevant to patentability of this invention.

U.S. Pat. Nos. 3,855,416 and 3,855,418 are directed towards lie detection by detecting emotional stress in speech by analyzing characteristics of the speech waveform. These patents are believed limited to analysis of waveforms produced upon utterance of the words "yes" and "no"; the analysis includes detecting aperiodic amplitude modulation within a preselected frequency envelope and thereafter weighing the detected amplitude modulations with a detected peak amplitude. The weighted function is displayed and compared to a preselected criteria after which the yes/no response, which produced the analyzed signal, is flagged as indicative of emotional stress and, therefore, possibly indicative of an untruthful answer by the subject under interrogation.

U.S. Pat. No. 3,855,418 teaches isolation and counting of the aperiodic amplitude modulations within the envelope and then displaying the count of the aperiodic modulation for each utterance rendered. From this an observer determines the level of emotional stress associated with a yes/no response and, therefore, whether the yes/no response was presumably truthful.

U.S. Pat. No. 3,971,034 is concerned with stress detection and records an utterance on a visible medium in order to identify frequency components indicative of stress. Infrasonic frequency signal, in the 8-12 Hz frequency range, which is below the audible range, is analyzed. Frequency shifts in this infrasonic signal of interest are considered to be stress indicators. Stress is allegedly detected independently of the linguistic content of the utterance.

The other patents are believed to be less relevant. U.S. Pat. No. 3,855,417 teaches filtering the human voice to provide a single frequency region signal, preferably in the region of the fundamental pitch of either the male or the female voice. A second frequency region of the speech signal, preferably a higher frequency region, is also filtered and rectified. Peak energy values from the envelopes of the two frequency regions are stored and compared in order to determine the stress state of the patient.

U.S. Pat. No. 3,278,685 detects slope reversals and zero crossings of amplitude-time curves produced from utterances. U.S. Pat. No. 3,278,685 notes that such slope reversals and zero crossings may be used to analyze presence or absence of stress or to detect or distinguish among different words.

U.S. Pat. No. 4,093,821 relates to speech analysis in which pitch or frequency changes are analyzed to determine the emotional state of the speaker. A first formant frequency band, extending from the fundamental frequency to about 1,000 Hz, is analyzed to find knolls or flat spots in an FM demodulated signal of the speaker. Small differences in frequency between short adjacent knolls are taught to be indicative of depression or stress whereas large differences in frequency between adjacent knolls are indicative of looseness or relaxation.

U.S. Pat. No. 4,139,732 utilizes a signal from a laryngograph which is partially clipped and rectified to produce a signal which can be smoothed with a very small time constant to give a good indication of a voice. The laryngograph produces larynx closure signals without interfering with the speech of the speaker; these are used to help deaf people learn to speak.

U.S. Pat. No. 4,142,067 is a continuation-in-part of U.S. Pat. No. 4,093,821 and teaches that a small amount of frequency modulation in a speaker's voice is indicative of mild stress while a normal level of frequency modulation indicates no stress. Appropriate lights (green, yellow and red) are turned on in response to the sensed state of stress as indicated by frequency modulation, or lack thereof, in the speaker's voice.

In the non-patent literature conceded to be prior art, "Teaching the Perception of Expressive Aspects of Vocal Communication" discloses that the human voice can be described in terms of its temporal intensity and frequency characteristics, both of which convey information concerning the speaker. The article suggests converting verbal signals to visual analogs for analysis. The speech signal is filtered and pressured speech, depression and mania are alleged to be indicated by the visible filtered representation of the voice.

"Infra-content Channels of Vocal Communication" teaches that speech intensity is a function of emotional state where the emotional state is defined by whether the speaker is giving a truthful or untruthful response to a stimulus.

These references, whether taken individually or in combination, do not suggest detecting suicidal predisposition in accordance with this invention.

OBJECTS OF THE INVENTION

A principal object of this invention is to provide a method for detecting suicidal predisposition by analyzing the voice.

Another object of this invention is to provide a method for detecting suicidal predisposition independently of linguistic content by analyzing the voice.

Yet another object of this invention is to provide two different methods, which may be practiced independently or together, for detecting suicidal predisposition by analyzing a speech signal, where the analysis is independent of the linguistic content of the speech.

SUMMARY OF THE INVENTION

This invention provides a method for detecting human suicidal predisposition using a vocal utterance, which is independent of linguistic content of the utterance.

In one embodiment the invention may begin with converting the utterance into an electrical signal having time varying amplitude and frequency representative of the utterance.

Since a reasonably pure voice signal from the person of interest is required for analysis, filtering may be necessary and/or desirable. Components of the signal may be filtered above and below preselected frequencies to obtain a signal within preselected frequency boundaries. Non-repetitive components having amplitude above some average amplitude of the signal may be filtered out of the signal. Repetitive signal components having frequency outside frequency bandwidth of the signal may be filtered out of the signal.

Once a reasonably pure voice signal from the person of interest has been obtained, the person is then identified as suicidally predisposed if signal amplitude exhibits a substantially non-instaneous decay to zero upon conclusion of the utterance. Alternatively, or complementally, the person is then identified as suicidally predisposed if signal amplitude modulation is low during the utterance.

The invention may further include eliciting a vocal utterance and recording the utterance or otherwise converting the utterance into a digital or analog electrical signal. Signal analysis can be done in either analog or digital format. Identification of the human as suicidally predisposed, if signal amplitude exhibits substantially non-instantaneous decay to zero upon conclusion of the utterance or if signal amplitude modulation is low, may be performed by preparing a display of the amplitude varying signal and visually examining the display for substantially vertical drop of the amplitude varying signal to zero upon conclusion of the utterance or for amplitude frequency modulation being low or for both.

Upon identifying the individual as being suicidally predisposed on the basis of the utterance, the individual may be restrained and/or medicated, depending on the judgement of the attending physician or other medical personnel.

DESCRIPTION OF THE PREFERRED EMBODIMENTS

This invention provides methods for detecting suicidal predisposition in humans by analyzing vocal utterances of a human of interest. The invention detects human suicidal predisposition independently of the linguistic content of the utterance.

Two different criteria have been identified as indicative of human suicidal predisposition.

The first criterion is the character of signal amplitude decay of the utterance upon conclusion of the utterance. One aspect of the invention lies in the discovery that a substantially non-instantaneous amplitude decay, upon conclusion of an utterance, is reliably indicative of suicidal predisposition in the individual producing the utterance.

The second criterion is the degree or amount of amplitude modulation of the utterance. A second aspect of the invention lies in the discovery that amplitude modulation of an utterance being low or less than a selected value is reliably indicative of suicidal predisposition in the individual.

Another aspect of the invention lies in the discovery that these two criteria may be independent; if either criterion is met, the individual is reliably indicated to be suicidally predisposed.

Figure 1:
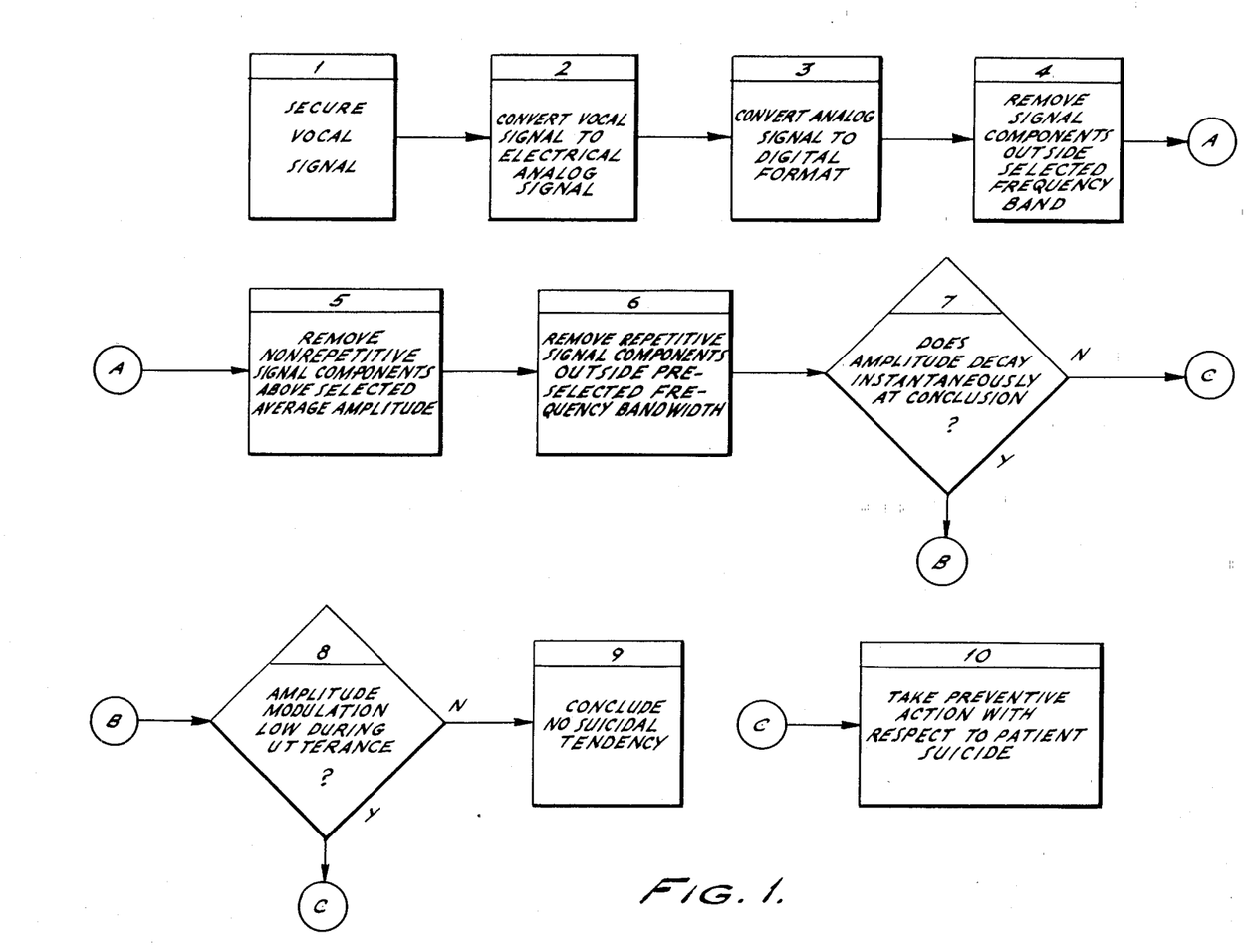
FIG. 1 is a block diagram, in schematic form, illustrating a series of steps which may be used to practice the invention.

Referring to FIG. 1 there is shown in schematic block diagram form a series of steps by which the invention may be practiced. As indicated in block 1, the first step is to secure a vocal signal from an individual of interest. This may be done by actively eliciting an utterance from an individual or it may be done by passively recording the individual's voice when the individual seeks professional help, calls a suicide hotline, speaks to a physician as part of a routine physical examination such as before issuance of a life insurance policy, and the like. The utterance may be of any content; no particular words need be uttered.

As indicated in block 2, the voice signal, however obtained, is converted in an electrical signal, preferably an electrical analog signal. This may be done with a conventional microphone and tape recorder, so long as the tape recorder has adequate frequency and amplitude bandwidth to record accurately the utterance in a manner that the signal can be analyzed as to frequency content and that no clipping of amplitude variations occurs.

As indicated in block 3, the analog signal is then preferably converted to digital format, using appropriate conventional signal processing techniques. While it is not critical to practice of the invention that the signal be converted from analog to digital form, digital form is much easier to work with since conventional mathematical sampling and numerical analysis techniques are easily applied to digital signals. Hence, while digital signals are preferable, they are not critical and the invention can be practiced analyzing the analog signal so long as instruments used are sufficiently sensitive to detect the criteria discovered to be indicative of suicidal predisposition, as explained below.

As indicated by block 4 in FIG. 1, once the signal is converted to digital format, signal components outside a selected frequency band are removed. This step is performed as one of a series to isolate the digital format signal representing the utterance of interest. Removal of these signal components outside the selected frequency band is desirable to eliminate extraneous noise, such as background noise, which may unavoidably be recorded along with the utterance of interest. For example, if the utterance of interest is taken from a suicide hotline and the caller is calling from a public telephone, street noise such as automobile engines, sirens and the like may be obtained along with the signal of interest. Before analysis of the signal of interest, it is necessary to remove such extraneous signals. In one practice of the invention all signal components below 200 Hz and above 10,000 Hz have been removed from the signal.

As indicated by block 5, further processng of the utterance signal may be done before analyzing that signal for suicidal predisposition characteristics. Specifically, nonrepetitive signal components above a selected average amplitude may be removed from the signal. In one practice of the invention non-repetitive signals having amplitude above ninety percent of the average amplitude of the recorded voice signal have been removed from the signal.

As indicated by block 6, still further processing of the utterance signal may be done before analyzing that signal for suicidal predisposition indicators. Specifically, repetitive signal components outside a preselected frequency bandwidth may be removed from the signal. In one practice of the invention repetitive signals having frequency outside the ninety percent frequency bandwidth of the human voice have been removed.

This signal processing results in the finished signal being essentially the human voice of interest. Substantially all extraneous signals have been removed, yielding a digital representatiton of a human voice ready for analysis to determine whether the speaker is suicidally predisposed.

Upon completion of signal processing, either or both of two criteria may be used to determine whether the person rendering the vocal utterance is suicidally predisposed. One criterion which may be applied is the character of decay of the time varying amplitude upon conclusion of an utterance. Substantially instantaneous decay to zero amplitude upon conclusion of an utterance reliably indicates absence of suicidal predisposition in the person rendering the utterance. Conversely, substantially non-instantaneous decay of the time varying amplitude signal upon conclusion a vocal utterance reliably indicates suicidal predisposition in the speaker.

The second criterion by which suicidal predisposition of the speaker may be determined is the degree of amplitude modulation during a vocal utterance. Visibly high amplitude modulation during a vocal utterance reliably indicates absence of suicidal predisposition in the person. Conversely, visibly low or minimal amplitude modulation during the vocal utterance reliably indicates suicidal predisposition in the speaker. Stated another way, persons with thinner, less rich vocal content are reliably suicidally predisposed while persons with a richer, thicker vocal content with higher amplitude modulation may be depressed but are reliably not suicidally predisposed.

EXAMPLE 1

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 2:
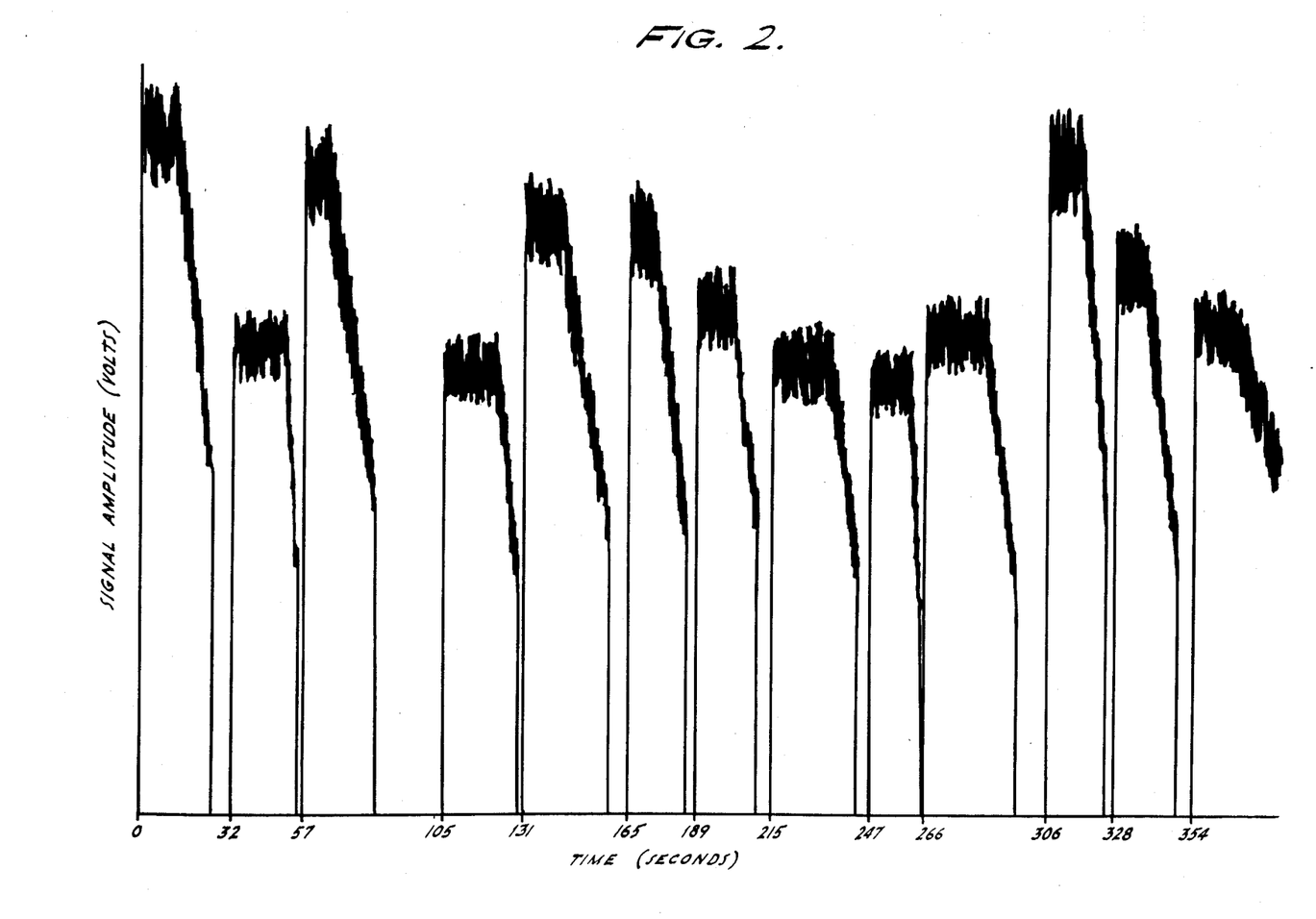
FIGS. 2 through 5 are amplitude-time displays of audible vocal signals of depressed persons determined to be suicidally predisposed utilizing the invention.

FIG. 2 is a reproduction of the strip chart recording. Non-instantaneous amplitude decay upon conclusion of each utterance is apparent. As is clearly visible in FIG. 2, the utterances, which begin at time 32 seconds, 57 seconds, 105 seconds, 131 seconds and the like, all decay substantially non-instantaneously upon conclusion. Moreover, amplitude modulation during the utterances is observed to be low. The depressed person whose utterances has the signal characteristics displayed in FIG. 2 attempted suicide.

EXAMPLE 2

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 3:
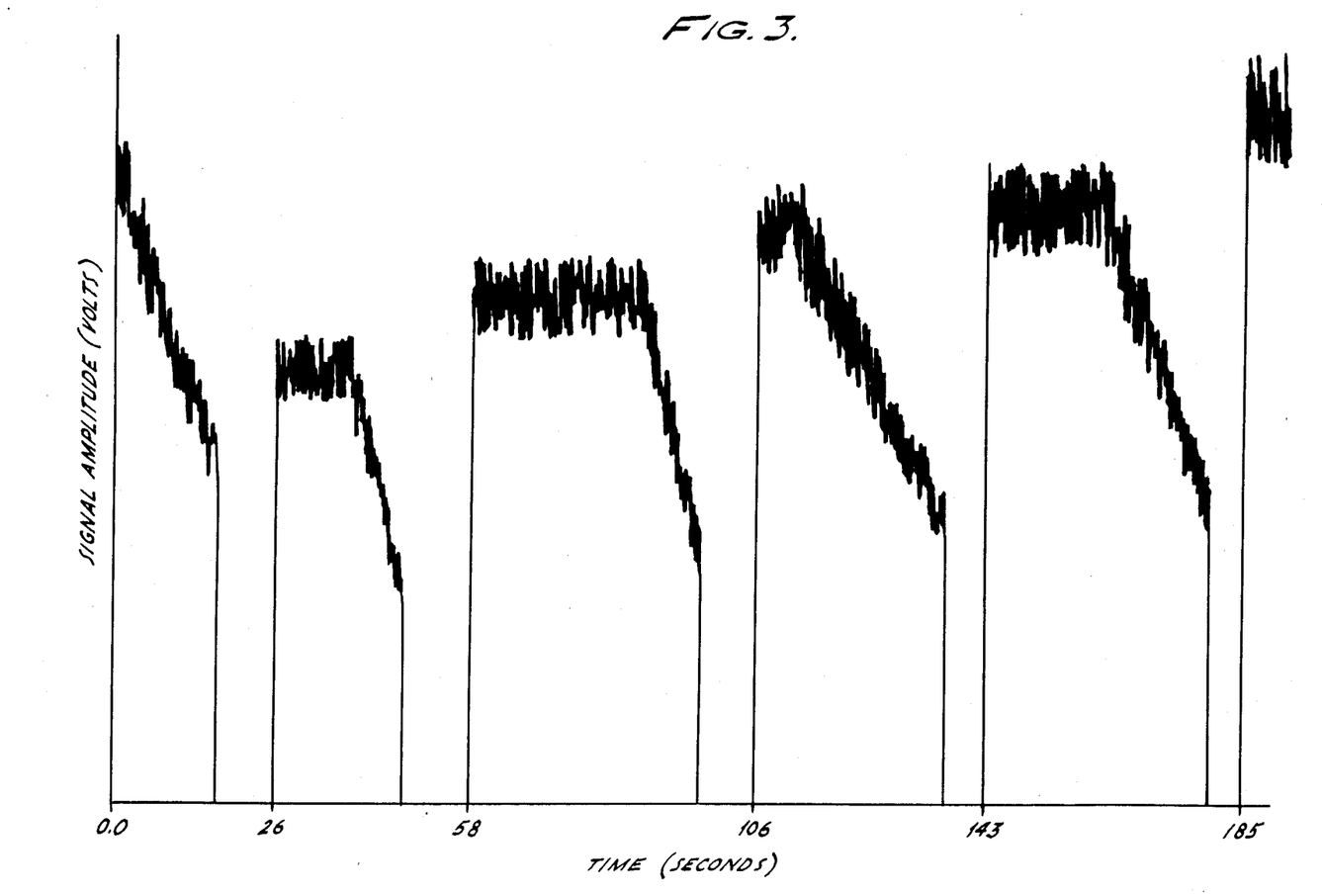

FIG. 3 is a reproduction of the strip chart recording. Non-instantaneous amplitude decay upon conclusion of each utterance is apparent. As is clearly visible in FIG. 3, the utterances, which begin at time 26 seconds, 58 seconds, 106 seconds, 143 seconds and the like, all decay substantially non-instantaneously upon conclusion. Moreover, amplitude modulation during the utterances is observed to be low. The depressed person whose utterances had the signal characteristics displayed in FIG. 3 attempted suicide.

EXAMPLE 3

A vocal signal including several utterances was secured from a depressed person. The vocal signal was converted into an electrical analog signal and was subsequently converted to digital format. Signal components below 200 Hz and above 10,000 Hz were removed as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 4:
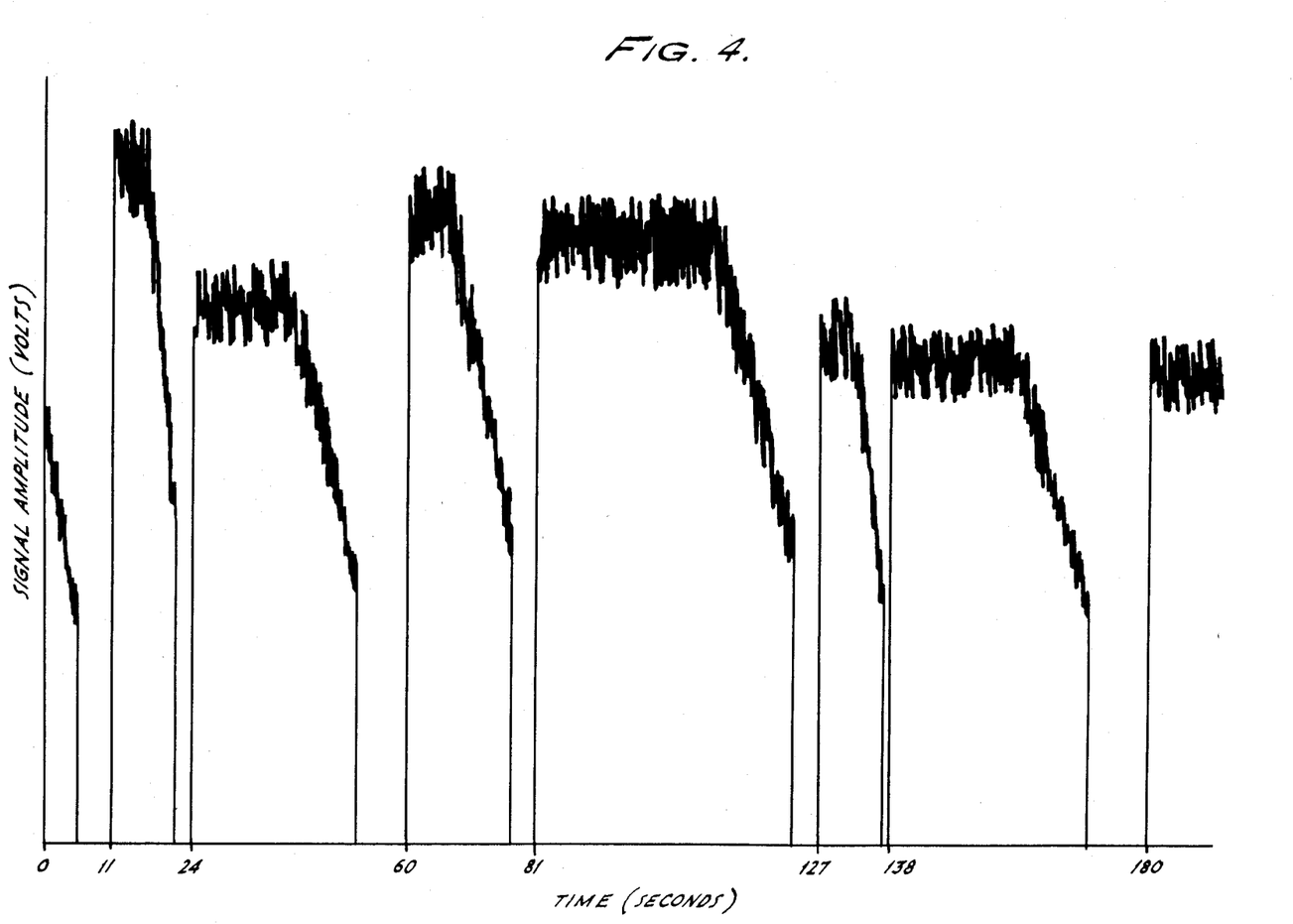

FIG. 4 is a reproduction of the strip chart recording. Non-instantaneous amplitude decay upon conclusion of each utterance is apparent. As is clearly visible in FIG. 4, the utterances, which begin at time 11 seconds, 24 seconds, 60 seconds, 81 seconds and the like, all decay substantially non-instantaneously upon conclusion. Moreover, amplitude modulation during the utterances is observed to be low. The depressed person whose utterances had the signal characteristics displayed in FIG. 4 attempted suicide.

EXAMPLE 4

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 5:
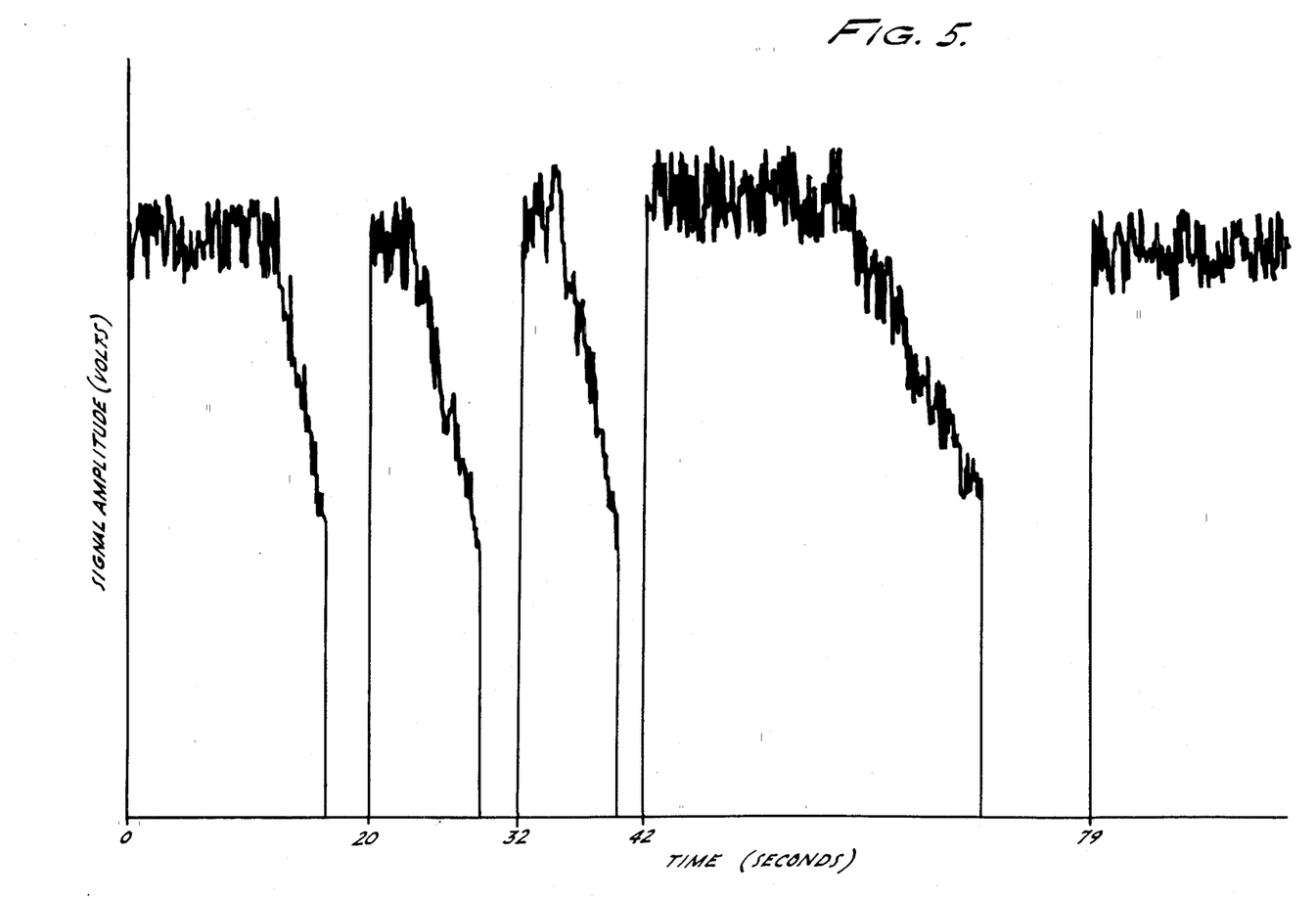

FIG. 5 is a reproduction of the strip chart recording. Non-instantaneous amplitude decay upon conclusion of each utterance is apparent. As is clearly visible in FIG. 5 the utterances, which begin at time 20 seconds, 32 seconds, 42 seconds, and the like, all decay substantially non-instantaneously upon conclusion. Moreover, amplitude modulation during the utterances is observed to be low. The depressed person whose utterances had the signal characteristics displayed in FIG. 5 attempted suicide.

EXAMPLE 5

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 6:
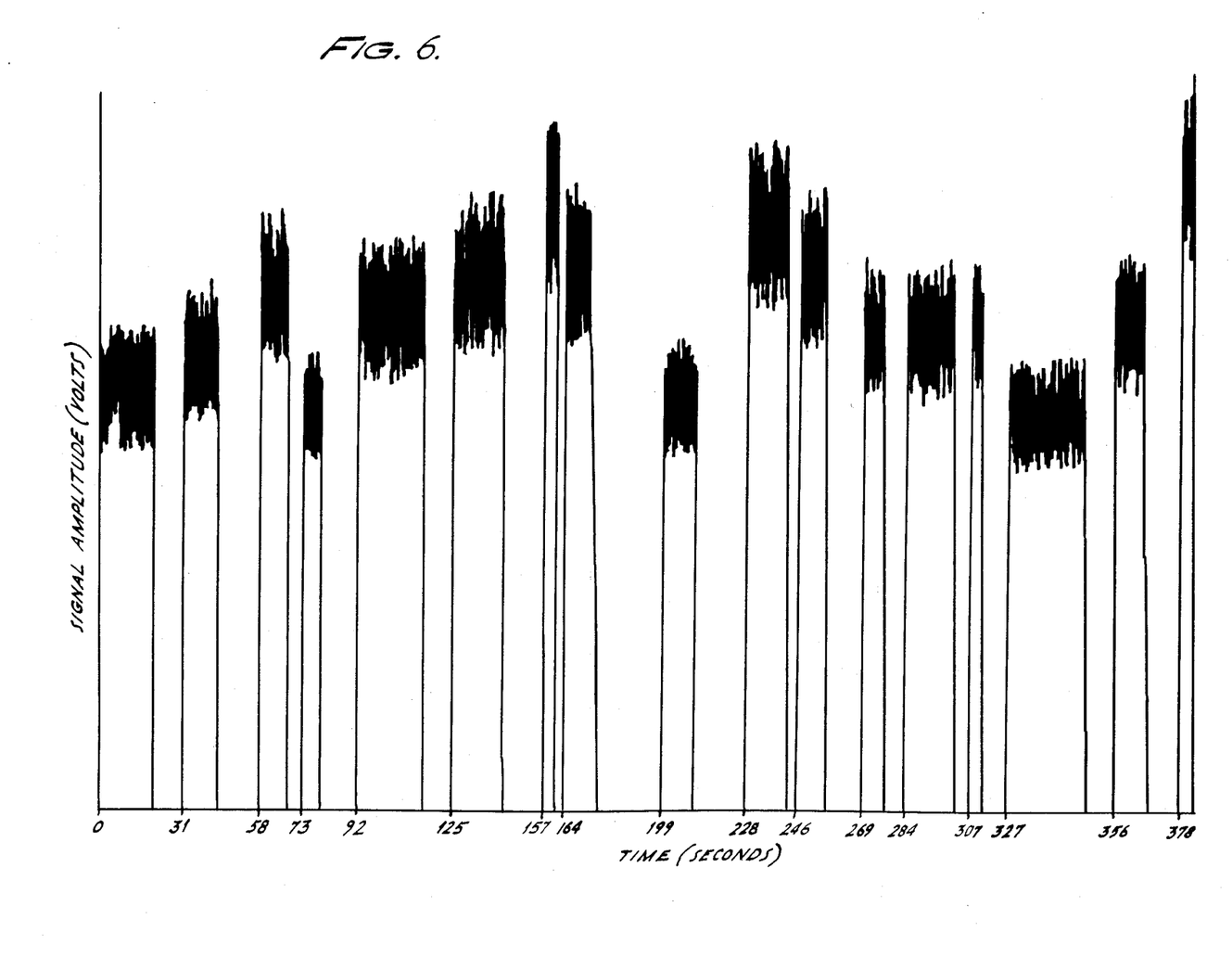
FIGS. 6 through 9 and amplitude-time displays of audible vocal signals of depressed persons determined not to be suicidally predisposed utilizing the invention.

FIG. 6 is a reproduction of the strip chart recording. Substantially instantaneous amplitude decay upon conclusion of each utterance is apparent. As is clearly visible in FIG. 6, the utterances, which begin at time 31 seconds, 58 seconds, 73 seconds, 92 seconds and the like, all decay substantially instantaneously upon conclusion. Moreover, amplitude modulation during the utterances is observed to be high. The depressed person whose utterances had the signal characteristics displayed in FIG. 6 did not at any time attempt suicide or in any other way exhibit any suicidal tendencies or desires.

EXAMPLE 6

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 7:
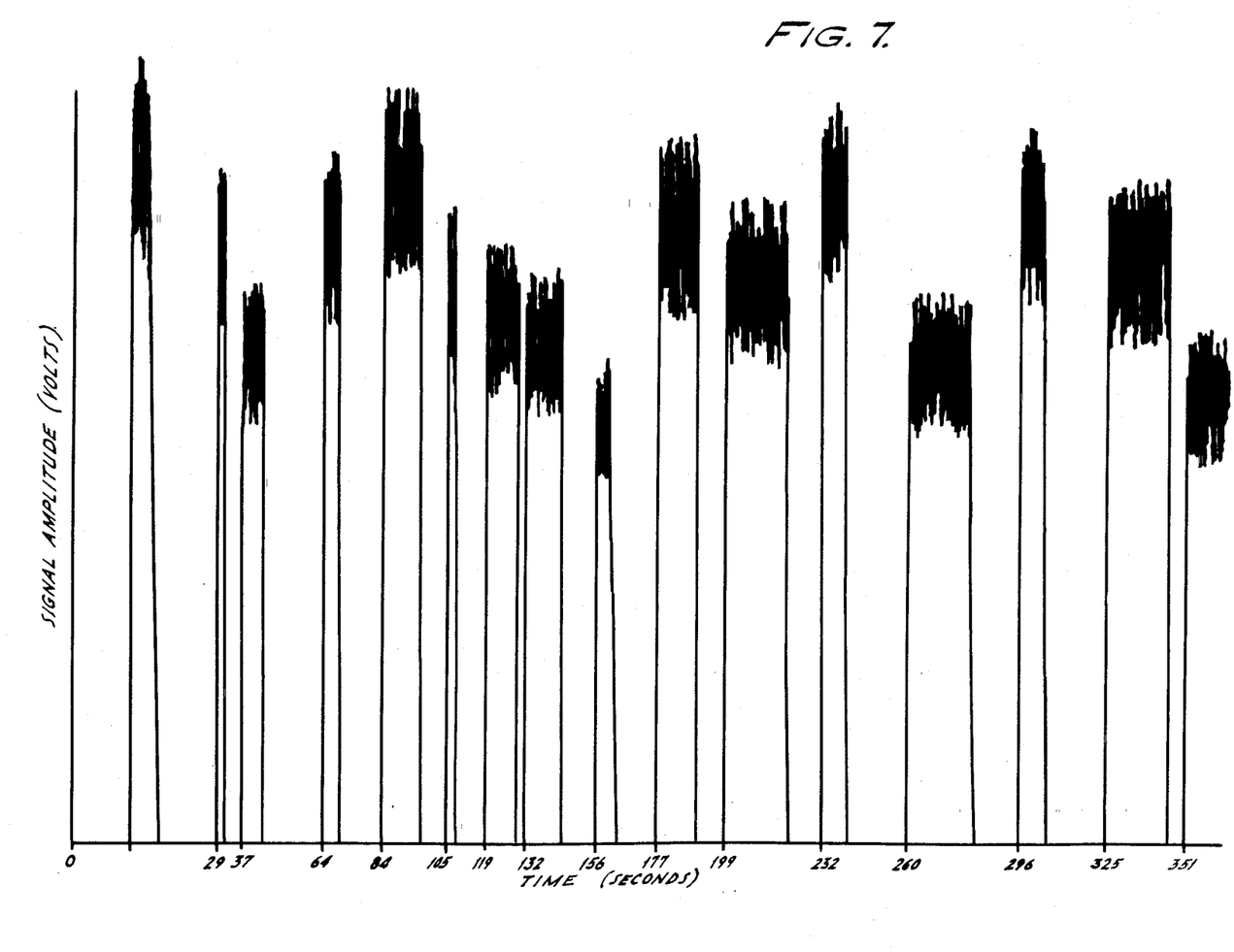

FIG. 7 is a reproduction of the strip chart recording. Substantially instantaneous amplitude decay upon conclusion of each utterance is apparent. As is clearly visible in FIG. 7, the utterances, which begin at time 29 seconds, 37 seconds, 64 seconds, 84 seconds and the like, all decay substantially instantaneously upon conclusion. Moreover, amplitude modulation during the utterances is observed to be high. The depressed person whose utterance had the signal characteristics displayed in FIG. 7 did not at any time attempt suicide or in any other way exhibit any suicidal tendencies or desires.

EXAMPLE 7

A vocal signal including several utterance was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 8:
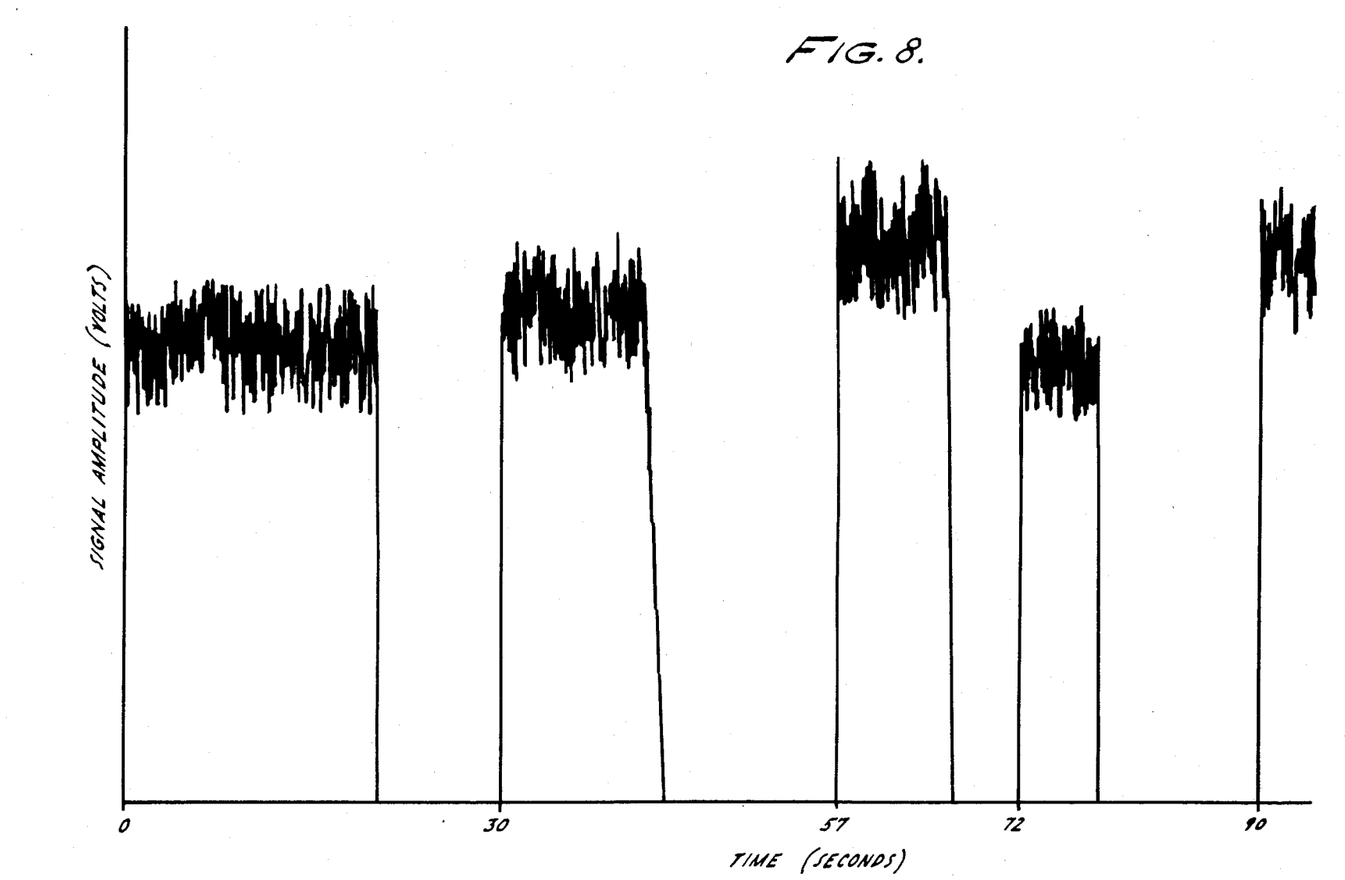

FIG. 8 is a reproduction of the strip chart recording. Substantially instantaneous amplitude decay upon conclusion of each utterance is apparent. As is clearly visible in FIG. 8, the utterances, which begin at time 30 seconds, 57 seconds, 72 seconds, and the like, all decay substantially instantaneously upon conclusion. Moreover, amplitude modulation during the utterances is observed to be high. The depressed person whose utterances had the signal characteristics displyaed in FIG. 8 did not at any time attempt suicide or in any other way exhibit any suicidal tendencies or desires.

EXAMPLE 8

A vocal signal including several utterances was secured from a depressed person. The vocal signal was converted into an electrical analog signal and was subsequently converted to digital format. Signal components below 200 Hz and above 10,000 Hz were removed, as were non-repetitive signals having amplitude above ninety percent of the average amplitude of the recorded vocal signal. Repetitive signal components having frequencies outside the ninety percent bandwidth of the recorded signal were then removed. The resulting signal, representative of the vocal signal, was graphically displayed and recorded on a strip chart recorder.

Figure 9:
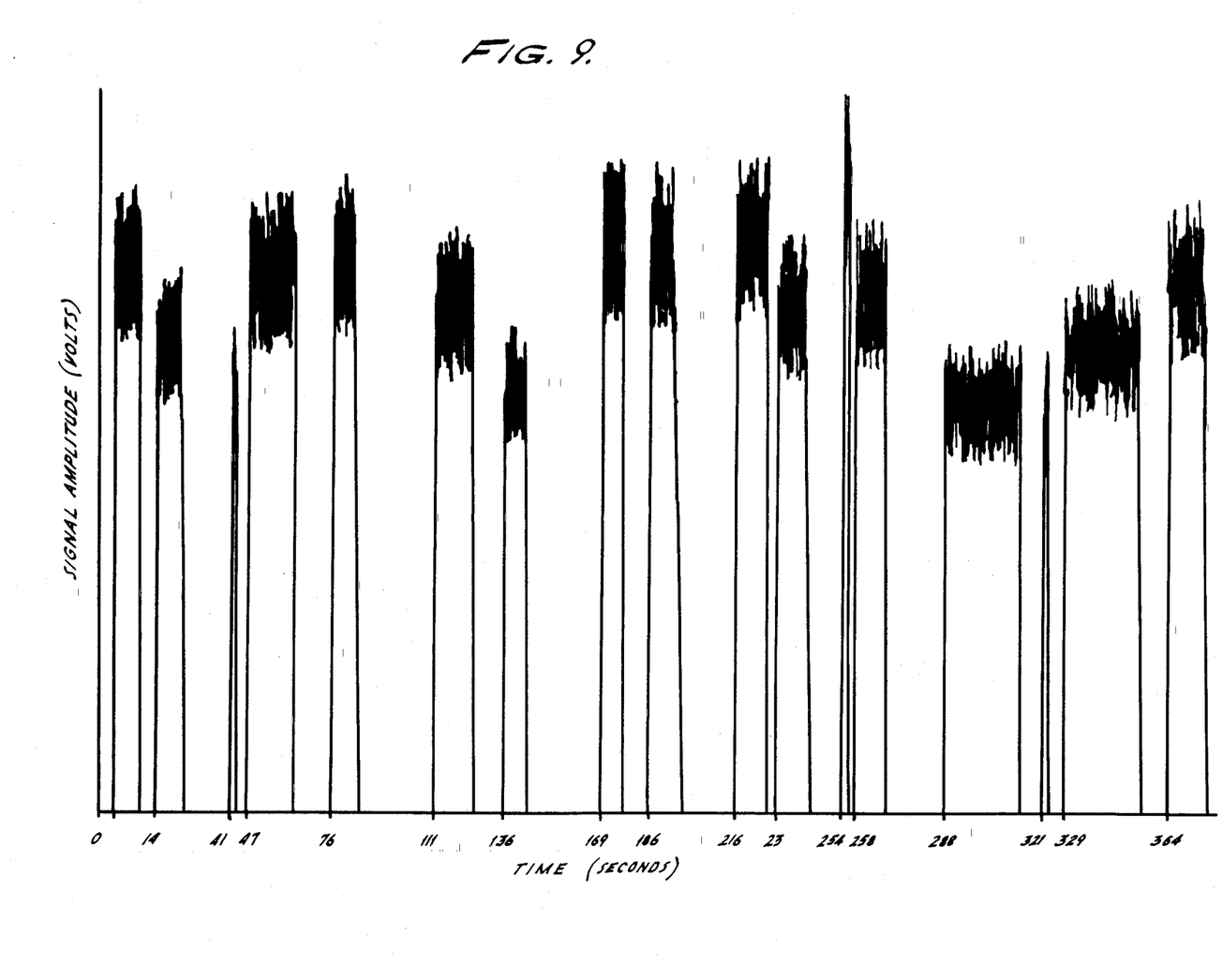

FIG. 9 is a reproduction of the strip chart recording. Substantially instantaneous amplitude decay upon conclusion of each utterance is apparent. As is clearly visible in FIG. 9, the utterances, which begin at time 14 seconds, 41 seconds, 47 seconds, 76 seconds and the like, all decay substantially instantaneously upon conclusion. Moreover, amplitude modulation during the utterances is observed to be high. The depressed person whose utterances had the signal characteristics displayed in FIG. 9 did not at any time attempt suicide or in any other way exhibit any suicidal tendencies or desires.

As the examples show, if the vocal signal secured from the speaker exhibits substantial instantaneous amplitude decay upon conclusion of an utterance or a series of utterances, or if the amplitude modulation is low during an utterance or a series of utterances, this is reliably indicative of suicidal predisposition. Conversely, if amplitude decays substantially instantaneously upon conclusion of an utterance or a series of utterances or if amplitude modulation is large during an utterance or a series of utterances, the speaker, while depressed, is reliably not suicidally predisposed. These two indicators, namely amplitude decay and amplitude modulation, are believed to be reliably independent but simultaneously occurring indications of suicidal predisposition or lack thereof. No vocal signal has been examined having amplitude decay indicative of suicidal predisposition while having amplitude modulation indicative of lack of suicidal predisposition, or vice versa.

To determine whether a person's vocal signal amplitude modulation is low, amplitude modulation during an utterance may be compared to that of a person known to be in good mental health, not susceptible to depression and not suicidally predisposed. The utterance amplitude modulation of the person known to be in good mental health may serve as a standard or benchmark. Such a person's amplitude modulation characteristic during an utterance would be similiar to those exhibited in FIGS. 6, 7, 8 and 9.

Where a graphic display of a mentally healthy person's amplitude modulation during an utterance is available, it is quite straightforward to compare the utterance amplitude modulation of a person of interest to the benchmark amplitude modulation of the known healthy person. In such case, the presence or absence of low amplitude modulation in the utterance of the person of interest is quickly apparent. The difference between low amplitude modulation in the utterance of the person of interest and benchmark amplitude modulation would be similar to the difference seen upon comparing FIGS. 5 and 9.

Similarly, presence or absence of substantially instantaneous amplitude decay upon conclusion of an utterance may easily be determined by comparing the vocal signal of a person of interest to that of a person known to be in good mental health, not susceptible to depression and not suicidally predisposed. The substantially instantaneous utterance amplitude decay of the person known to be in good mental health may also serve as another standard or benchmark. Such a person's amplitude decay at the end of an utterance would be similar to those exhibited in FIGS. 6, 7, 8 and 9.

Where a graphic display of a mentally healthy person's amplitude decay at the end of an utterance is available, it is quite straightforward to compare the amplitude decay at the end of an utterance of a person of interest to the benchmark amplitude decay of the known healthy person. In such case, the presence or absence of substantially instantaneous amplitude decay upon conclusion of the utterance of the person of interest is quickly apparent. The difference between substantially non-instantaneous amplitude decay upon conclusion of the utterance of the person of interest and benchmark amplitude decay would be similar to the difference seen upon comparing FIGS. 2 and 6.

Of course, if the speaker is suicidally predisposed, the invention encompasses the step of taking preventive action with respect to the speaker in order to prevent suicide. This may include administration of drugs, physically restraining the speaker, merely continuing observation of the speaker, a combination of these steps or other steps deemed appropriate in the mind of the attending physician or other health care professional.

I claim:

1. A method for electronically detecting human suicidal predisposition by analysis of a series of closely spaced utterances from an emotionally disturbed person actively seeking professional help independently of linguistic content, including the steps of:
   (a) converting the utterances into an electrical signal having time varying amplitude and frequency which are representative thereof;
   (b) filtering frequency components of said signal above and below preselected frequencies to obtain a signal within said preselected frequencies;
   (c) filtering non-repetitive components, having amplitude above about 90% of average amplitude of the signal, out of the signal;
   (d) filtering repetitive signal components having frequency outside about 90% frequency bandwidth of the signal, out of the signal;
   (e) identifying as suicidally predisposed a person from whom said vocal utterance emanated if signal amplitude exhibits substantially non-instanteous decays upon conclusion of each utterance, relative to the decays of utterance signals from persons known to be in good mental health.

* * * * *